United States Patent
Bickford

[11] Patent Number: 6,142,203
[45] Date of Patent: Nov. 7, 2000

[54] RESILIENT WHEEL WITH STEEL-BANDED PRESS-ON SOLID PNEUMATIC TIRE

[75] Inventor: Calvin F. Bickford, Lisbon Falls, Me.

[73] Assignee: Maine Rubber International, Westbrook, Me.

[21] Appl. No.: 09/061,742

[22] Filed: Apr. 16, 1998

Related U.S. Application Data

[63] Continuation-in-part of application No. 08/922,708, Sep. 3, 1997, abandoned, and a continuation-in-part of application No. 08/988,891, Dec. 11, 1997, abandoned.

[51] Int. Cl.$^7$ ............................................. B60C 7/00
[52] U.S. Cl. ..................... 152/302; 152/267; 152/323; 152/394
[58] Field of Search .................... 152/302, 323, 152/393, 394, 267, 268, 305

[56] References Cited

U.S. PATENT DOCUMENTS

| | | |
|---|---|---|
| 678,340 | 7/1901 | Holland . |
| 923,733 | 6/1909 | Timerman . |
| 927,355 | 7/1909 | Karlstrom et al. . |
| 1,262,154 | 4/1918 | Zeitler . |
| 1,343,154 | 6/1920 | Ostmann ................................ 152/393 |
| 1,351,856 | 9/1920 | Lambert ................................ 152/393 |
| 1,391,846 | 9/1921 | Nienaber ................................ 152/393 |
| 1,401,061 | 12/1921 | Flynn . |
| 1,440,974 | 1/1923 | Dornburgh . |
| 1,575,910 | 3/1926 | Goersch . |
| 2,090,696 | 8/1937 | Moening ................................ 152/305 |
| 2,525,196 | 10/1950 | Bacon . |
| 2,564,858 | 3/1951 | Griffith ................................ 152/198 |
| 2,955,637 | 10/1960 | Hartzmark . |
| 4,111,249 | 9/1978 | Markow ................................ 152/330 |
| 4,318,434 | 3/1982 | Markow . |
| 4,573,510 | 3/1986 | Ippen et al. . |

FOREIGN PATENT DOCUMENTS

| | | |
|---|---|---|
| 144582 | 6/1985 | European Pat. Off. . |
| 2047520 | 5/1971 | France . |
| 2696979 | 11/1993 | France . |
| 916154 | 8/1954 | Germany . |
| 1923423 | 11/1970 | Germany . |
| 4104457 | 8/1992 | Germany . |
| 6-143911 | 5/1994 | Japan . |
| 24406 | 5/1906 | United Kingdom . |
| 2130535 | 9/1983 | United Kingdom . |

*Primary Examiner*—Geoffrey L. Knable
*Attorney, Agent, or Firm*—Woodard, Emhardt, Naughton, Moriarty & McNett

[57] ABSTRACT

The present invention relates to a resilient wheel for solid pneumatic tires in which a resilient rubber or rubber-like material is bonded and cured to a wheel hub. A rigid outer support band, such as a steel band, is then bonded to the resilient material, thereby making a larger diameter wheel having the resilient material layer bonded between the inner hub and the outer support band. A replaceable tread is formed by bonding a tread compound to an inner rigid support band, such as a steel band. The replaceable tread may be fitted to the resilient wheel by a friction fit between the two steel support bands or by a bolt-on construction. When the tread has been worn down after use, the tread layer may be removed and a new one substituted therefor, thereby obviating the need to scrap the entire wheel. The resilient wheel portion may therefore be used on a repeating basis, replacing the tread layer portion as necessary. A preferred embodiment comprises a steel banded solid tire in which a 360° steel band is embedded within the replaceable tread portion. By including such a steel band within the replaceable tread portion, the tread is given a 360° reinforced platform which distributes the load forces throughout the entire tire and provides better load capacity and a more effective tire system than prior art solid tire designs.

16 Claims, 5 Drawing Sheets

6,142,203

RESILIENT WHEEL WITH STEEL-BANDED PRESS-ON SOLID PNEUMATIC TIRE

CROSS-REFERENCE TO RELATED APPLICATIONS

The present application is a continuation-in-part of U.S. patent application Ser. No. 08/922,708, filed Sep. 3, 1997, now abandoned and U.S. patent application Ser. No. 08/988,891, filed Dec. 11, 1997 now abandoned.

TECHNICAL FIELD OF THE INVENTION

The present invention generally relates to vehicle tires and, more particularly, to a resilient wheel with a steel-banded press-on solid pneumatic tire.

BACKGROUND OF THE INVENTION

Pneumatic shaped solid tires are known in the prior art and are used to replace pneumatic tires in many industrial applications, such as forklifts, baggage carts, and catering vehicles. Solid tires offer the advantages of increased load-bearing capabilities and elimination of the possibility of dangerous blow-outs and costly flat tires.

A typical prior art pneumatic shaped solid tire is illustrated in partial cross-sectional view in FIG. 1 and indicated generally at 10. The outer portion 12 of the tire 10 is a tread rubber compound which is compounded to give wear and grip to the tire, and is maximized for high abrasion, high tear resistance and strength, and low rolling resistance. Typical prior art treads 12 are formed from black compound, comprising a mixture of natural rubber (which can be contain a ratio of synthetic rubber), carbon black, a cure system, an aging system, and a plasticity system for the vulcanization process. Other tread compounds are known in the prior art. For example, a white compound is sometimes used for the tread 12, which is the same as the black compound but has white silica substituted for the carbon black. Beneath the tread compound 12 is a hard base rubber layer 14 which is used to grip the rim of the wheel (not shown) upon which the tire 10 is mounted and to support the tire 10 upon this rim. A typical prior art material used for the hard base rubber layer 14 is known as cording compound, which comprises synthetic rubbers (and possibly a ratio of natural rubber), long-length fibers, carbon black, a cure system, and an aging system for the vulcanization process. The cording compound is compounded for hardness and high modulus. The tire 10 may also have a bead 16 on each side of the tire 10, located near the inside perimeter of the tire 10. The bead 16 provides strength to the tire at the intersection with the lip of the rim upon which the tire 10 is mounted. The beads 16 may be pneumatic beads which may be assembled with ply fabric, for example. Alternatively, the beads 16 may comprise steel round wire which may be assembled in a cage.

Because the tread compound 12 is somewhat hard in order to provide high wear resistance and low rolling resistance, and because the layer 14 is also hard in order to provide structural rigidity to the tire at its mounting location, it has been found that the tire 10 may not provide a soft enough ride in some industrial applications, such as with forklifts carrying fragile cargo. The vibration transmitted through the tire 10, to the forklift and to the cargo, caused by the tire 10 rolling over surface irregularities, is unacceptable for some applications. Thus, a second embodiment prior art tire is illustrated in FIG. 2 which alleviates some of these problems, and is indicated generally at 20. The tire 20 includes the tread compound layer 12, the hard base rubber layer 14, and the beads 16 of the tire 10. However, a soft cushion rubber layer 22 is formed between the tread compound 12 and the hard base rubber layer 14. The cushion rubber layer 22 is formed from a softer rubber compound in order to absorb a portion of the shocks and vibrations produced by the tire 20 rolling over irregular surfaces. This translates into a much softer and less jarring ride for the piece of equipment riding upon the tires 20.

While prior art solid tire designs such as the tires 10 and 20 illustrated in FIGS. 1–2 provide adequate performance in industrial settings, they suffer from the problem that a majority of the load weight is supported by the relatively small portion of the tire which lies directly under the wheel at any given time. In other words, the portions of the tire to either side of the wheel and above the wheel (which comprises a majority of the tire) do not support any appreciable portion of the load weight. By concentrating the load weight on a small section of the tire at any given time, the tire is forced to endure much higher stresses than would be the case if the load were evenly distributed around the entire tire. Such increased effective loading results in faster tire wear than would be the case with distributed loading.

Furthermore, while prior art solid tire designs, such as the tires 10 and 20 illustrated in FIGS. 1–2, provide adequate performance in industrial settings, they suffer from the problem that the tire must be scrapped after the relatively thin thread portion has been worn away. As the remaining portion of the tire that is scrapped comprises a majority of the cost of the tire, this situation is economically undesirable.

There is therefore a need for a solid pneumatic-shape tire system in which the entire tire does not need to be scrapped after the tread has worn out. There is also a need for a solid tire design which provides for more effective distribution of the load weight throughout the entire tire, thereby providing higher load capacity for the tire and a more effective tire system. The present invention is directed toward meeting these needs.

SUMMARY OF THE INVENTION

The present invention relates to a resilient wheel for solid pneumatic tires in which a resilient rubber or rubber-like material is bonded and cured to a wheel hub. A rigid outer support band, such as a steel band, is then bonded to the resilient material, thereby making a larger diameter wheel having the resilient material layer bonded between the inner hub and the outer support band. A replaceable tread is formed by bonding a tread compound to an inner rigid support band, such as a steel band. The replaceable tread may be fitted to the resilient wheel by a friction fit between the two steel support bands or by a bolt-on construction. When the tread has been worn down after use, the tread layer may be removed and a new one substituted therefor, thereby obviating the need to scrap the entire wheel. The resilient wheel portion may therefore be used on a repeating basis, replacing the tread layer portion as necessary. A preferred embodiment comprises a steel banded solid tire in which a 360° steel band is embedded within the replaceable tread portion. By including such a steel band within the replaceable tread portion, the tread is given a 360° reinforced platform which distributes the load forces throughout the entire tire and provides better load capacity and a more effective tire system than prior art solid tire designs.

In one form of the invention, a resilient wheel having a press-on solid pneumatic tire is disclosed, comprising: a wheel hub having an outer hub surface; a first resilient layer having a first outer resilient surface and a first inner resilient surface facing the outer hub surface; a first 360 degree rigid band having a first inner band surface facing the outer resilient surface and a first outer band surface; a second 360 degree rigid band having a second inner band surface facing the first outer band surface and a second outer band surface; a second resilient layer having a second outer resilient surface and a second inner resilient surface facing the second outer band surface; a third 360 degree rigid band having a third inner band surface facing the second outer resilient surface and a third outer band surface; and a tread layer having an inner surface facing the third outer band surface.

In another form of the invention a press-on solid pneumatic tire is disclosed, comprising: a first 360 degree rigid band having a first inner band surface and a first outer band surface; a resilient layer having an outer resilient surface and an inner resilient surface facing the first outer band surface; a second 360 degree rigid band having a second inner band surface facing the outer resilient surface and a second outer band surface; and a tread layer having an inner surface forming the second outer band surface.

DETAILED DESCRIPTION OF THE PREFERRED EMBODIMENTS

Figure 1:
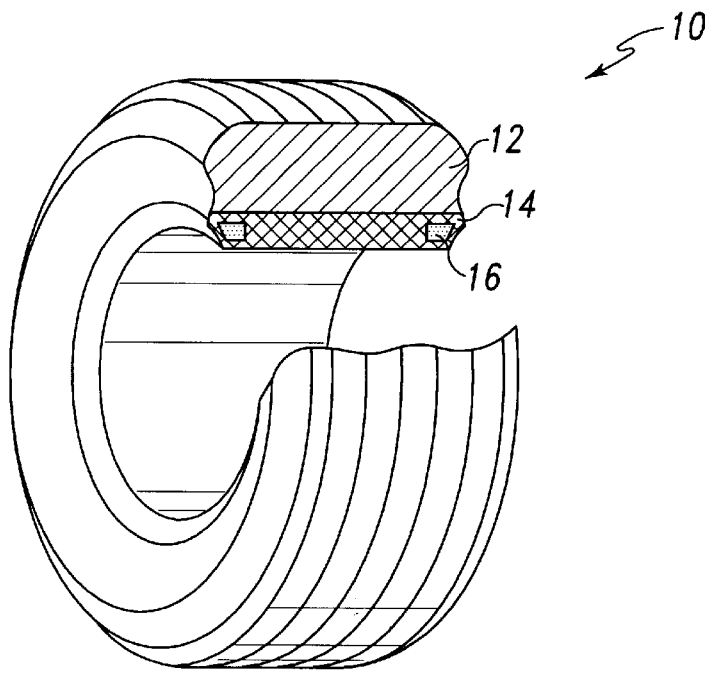
FIG. 1 is a partial cross-sectional perspective view of a first embodiment prior art solid tire.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
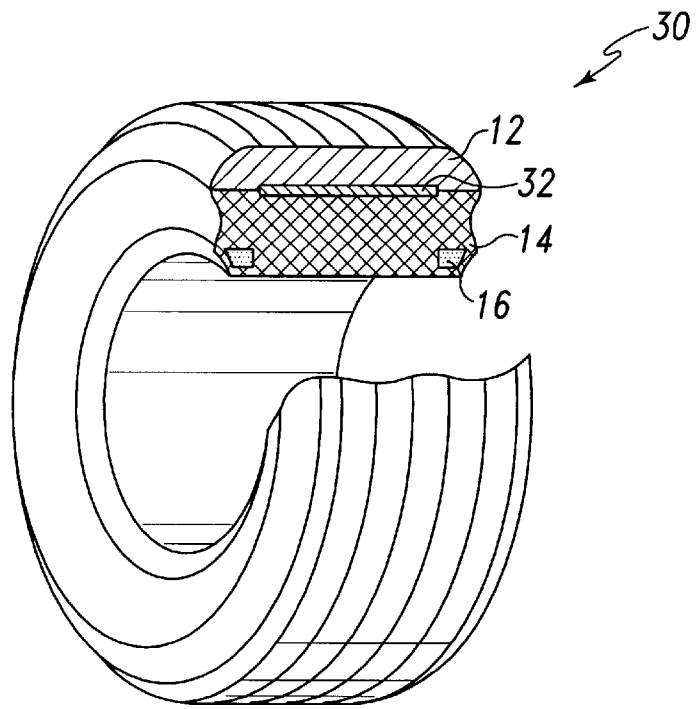
FIG. 3 is a partial cross-sectional perspective view of a first embodiment solid tire constructed according to the present invention.
Figure 5:
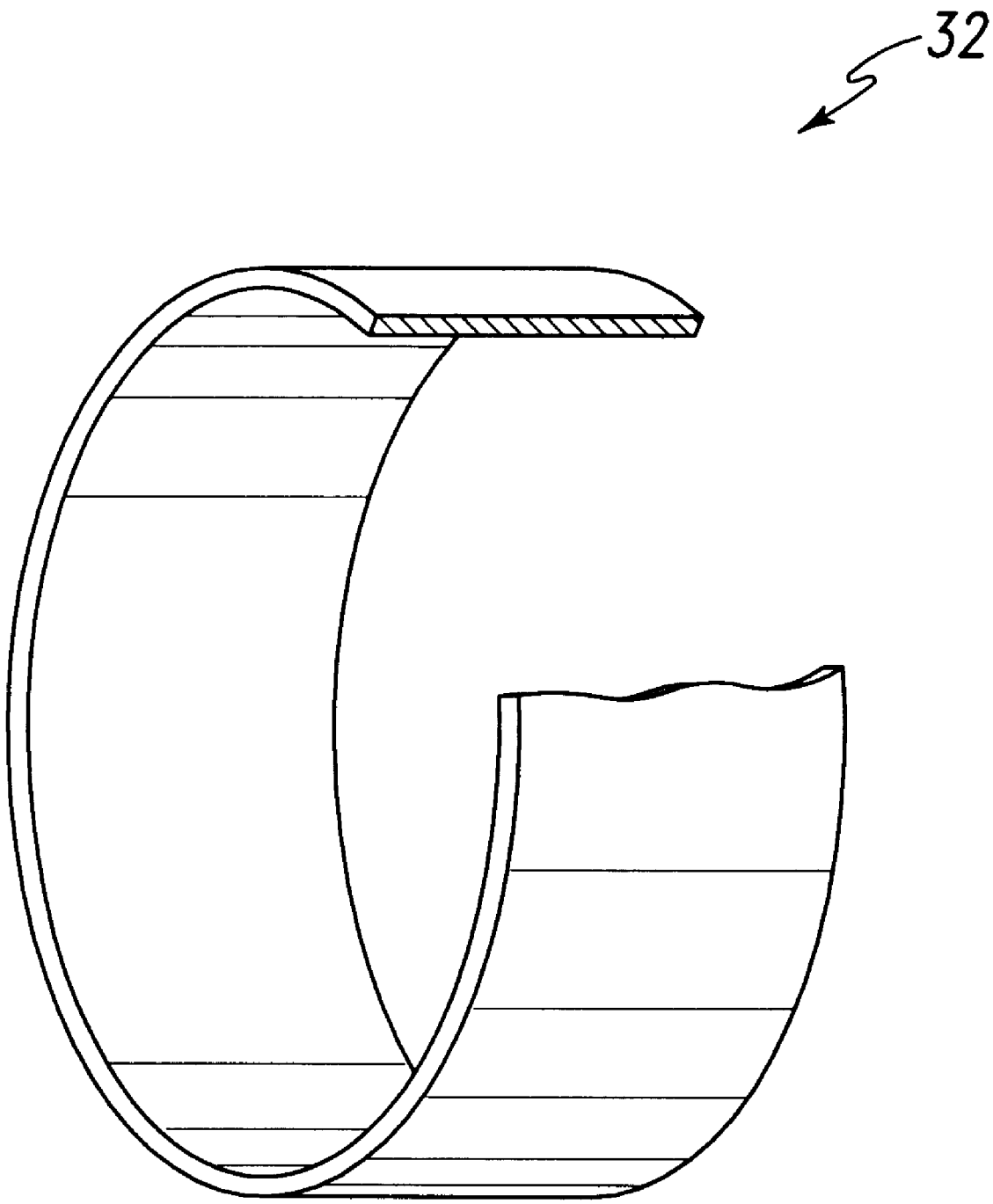
FIG. 5 is a partial cross-sectional perspective view of a steel band configured according to the present invention.

A first embodiment solid tire constructed according to the principles of the present invention is illustrated in partial cross-sectional perspective view in FIG. 3, and indicated generally at 30. Like the prior art tire 10 of FIG. 1, the tire 30 includes a tread rubber compound 12, a hard base rubber layer 14, and beads 16. However, unlike the tire 10, the tire 30 includes a 360° steel band 32 formed just below the tread compound 12. The steel band 32 is illustrated individually in FIG. 5.

The function of the steel band 32 is to provide a 360° reinforced platform for the tread compound 12 which serves to distribute the load forces from the vehicle throughout the tire 30. With the inclusion of the steel band 32, the majority of the load forces are no longer concentrated in the portion of the tire lying directly below the vehicle wheel. Instead, the 360° steel band 32 causes a distribution of the load forces throughout the tire 30, such that the load not only rests upon the lower portion of the tire 30, but also "hangs" from the upper portions of the tire 30. By distributing the load in this manner, the effective load weight on any given portion of the tire 30 located below the wheel is considerably less than would be the case if the steel band 32 were not present (such as with the prior art tire 10). Thus, the tire 30 provides greater load capacity and a more effective tire system.

Figure 2:
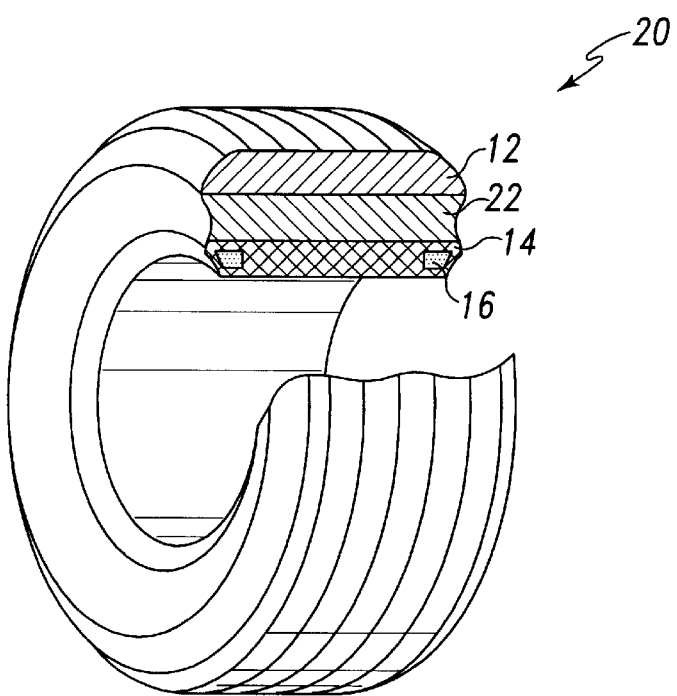
FIG. 2 is a partial cross-sectional perspective view of a second embodiment prior art solid tire.
Figure 4:
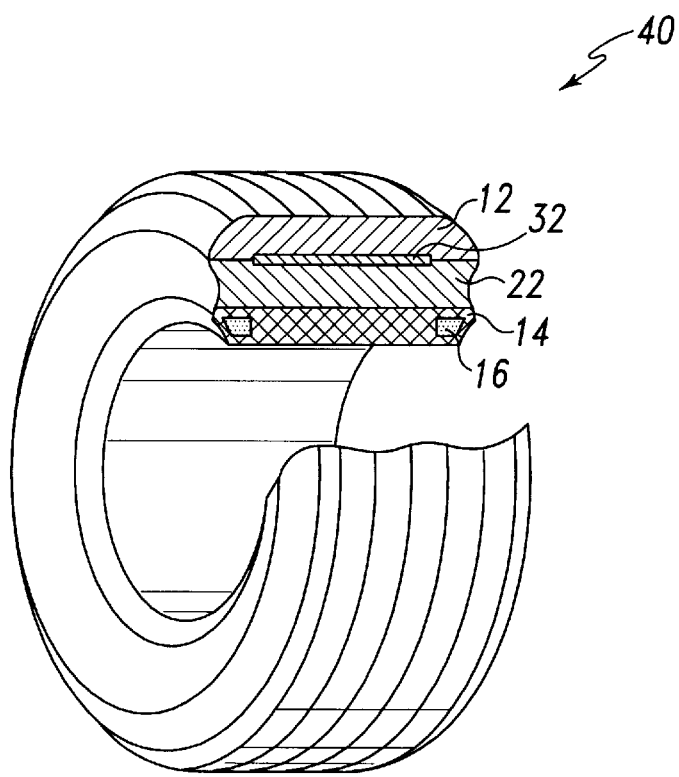
FIG. 4 is a partial cross-sectional perspective view of a second embodiment solid tire constructed according to the present invention.

A second embodiment solid tire of the present invention is illustrated in a partial cross-sectional perspective view in FIG. 4 and indicated generally at 40. The second embodiment tire 40 is similar to the first embodiment tire 30, however, a cushion rubber layer 22 is inserted between the steel band 32 and the hard base rubber layer 14. The inclusion of the cushion rubber layer 22 provides the soft ride benefits discussed hereinabove with respect to FIG. 2. Inclusion of the steel band 32 beneath the tread compound layer 12 in the tire 40 provides the same benefits described hereinabove with respect to tire 30.

In a preferred embodiment, the steel band 32 is formed from C1015 steel which is 13–18 carbon and 30–60 manganese. The steel is preferably 5/16 of an inch thick and is recessed from the tire sidewall by 1/4 inch±1/8 inch. Those having ordinary skill in the art will recognize that the benefits of the present invention result from providing a 360° reinforced platform under the tread compound 12. Therefore, although the preferred embodiment construction of the band 32 is steel, other materials will work equally well. For example, other metals, such as aluminum, may also be used. Furthermore, non-metallic materials may be used for the band 32, such as a high-strength plastic, carbon fiber, etc. It is only necessary that the material used for the band 32 have high enough strength to provide a 360° rein-forced platform under the tread compound 12.

Figure 6:
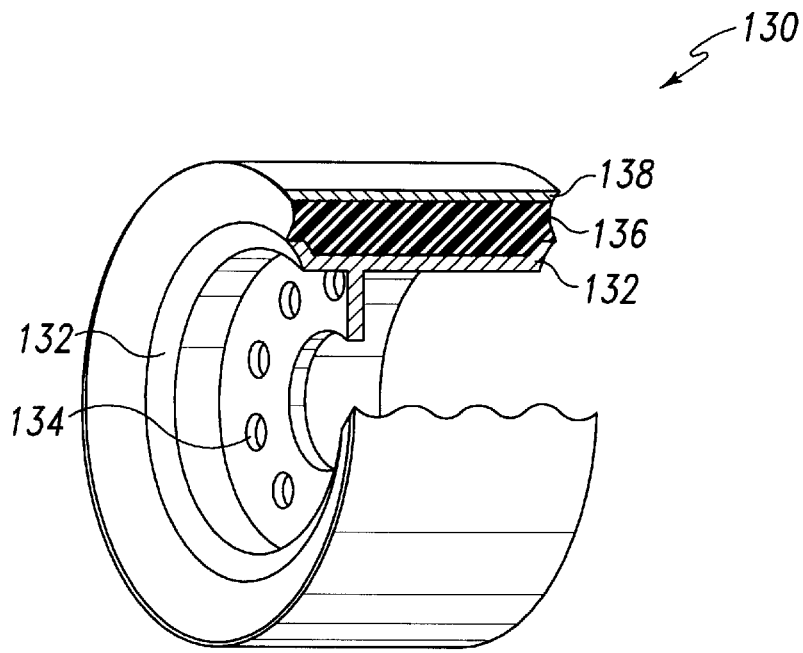
FIG. 6 is a partial cross-sectional perspective view of a first embodiment resilient wheel of the present invention.

A first embodiment resilient wheel constructed according to the principles of the present invention is illustrated in partial cross-sectional perspective view in FIG. 6, and indicated generally at 130. The resilient wheel 130 includes a conventional wheel hub 132 having a series of spaced holes 134 adapted for bolting the resilient wheel 130 to a vehicle axle (not shown).

Bonded and cured to the outer surface of the wheel hub 132 is a resilient rubber layer 136 formed from any natural or synthetic rubber material. In the preferred embodiment of the present invention, the resilient rubber layer 136 is formed from a soft rubber compound in order to absorb a portion of the shocks and vibrations produced by the wheel 130 rolling over irregular surfaces. This provides a much softer and less jarring ride for the piece of equipment riding upon the wheel 130.

The resilient rubber layer 136 is additionally bonded and cured to an outer 360° rigid band 138, such as a steel band. The rigid band 138 encircles the entire outer circumference of the resilient wheel 130. In a preferred embodiment, the band 138 is formed from C1015 steel which is 13–18 carbon and 30–60 manganese. The band 138 is preferably 5/16 of an inch thick. Although the preferred embodiment construction of the band 138 is steel, other materials will work equally well. For example, other metals, such as aluminum, may also be used. Furthermore, non-metallic materials may be used for the band 138, such as a high-strength plastic, carbon fiber, etc. It is only necessary that the material used for the band 138 have high enough strength to provide an adequate mounting platform for the replaceable tread construction described hereinbelow.

Figure 7:
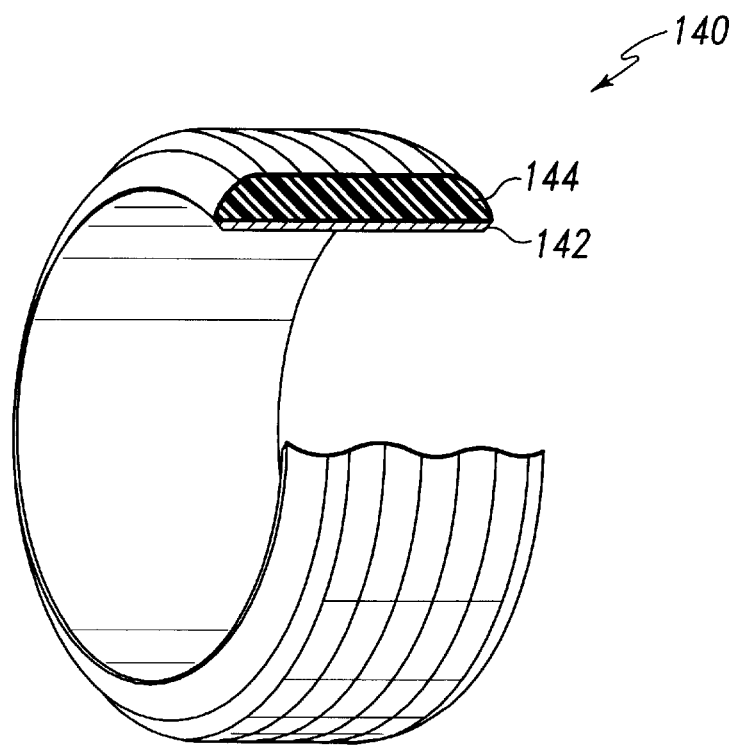
FIG. 7 is a partial cross-sectional perspective view of a first embodiment replaceable tread construction of the present invention.

Referring now to FIG. 7, there is illustrated a first embodiment replaceable tread construction of the present invention which may be used with the resilient wheel 130, the replaceable tread construction being indicated generally at 140. The replaceable tread construction 140 comprises a second 360° rigid band 142, such as a steel band. In a preferred embodiment, the steel band 142 is formed from the same material as the steel band 138, however, the alternative materials discussed hereinabove with respect to the band 138 are equally applicable to the band 142. A tread 144 is bonded and cured to the rigid band 142 along its entire outer circumference. The present invention comprehends the use of any tread compound for the tread 144, such as the prior art black compound.

Figure 8:
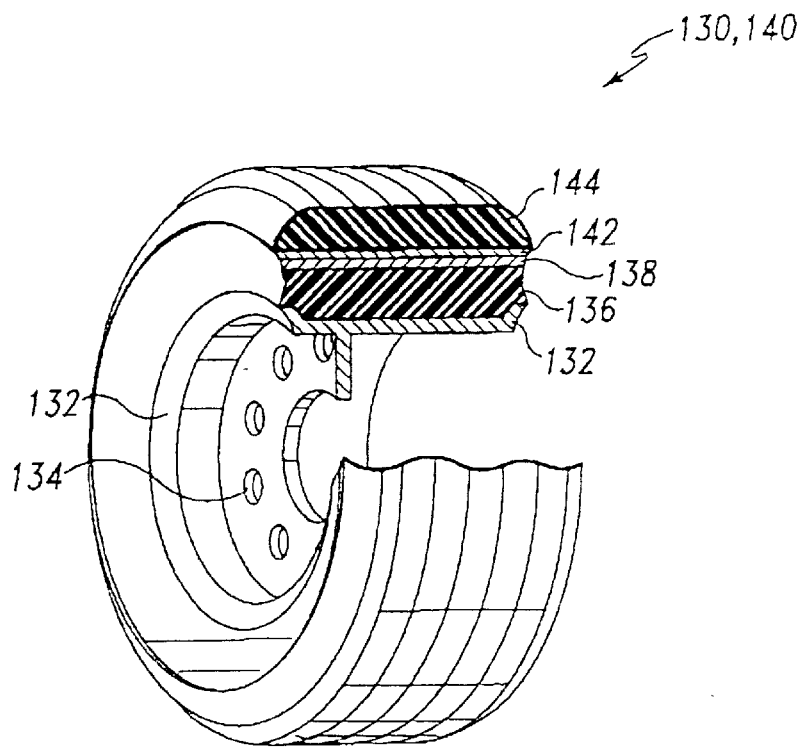
FIG. 8 is a partial cross-sectional perspective view of the first embodiment replaceable tread construction of FIG. 4 bonded to the preferred embodiment resilient wheel of FIG. 3.

Thus constructed, the replaceable tread construction 140 may be fitted to the resilient wheel 130 in order to form a completed wheel as illustrated in FIG. 8 and indicated generally at 150. The replaceable tread construction 140 may be fitted to the resilient wheel 130 by a friction fit, in which the inner diameter of the rigid band 142 is formed to be slightly smaller than the outer diameter of the rigid band 138. The replaceable tread construction 140 may then be forced onto the resilient wheel 130, the interference between the dimensions of the rigid bands 138 and 142 acting to hold the replaceable tread construction 140 firmly upon resilient wheel 130. Alternatively, the replaceable tread construction 140 may be bolted onto the resilient wheel 130 through the tread or through the tread sidewall. Alternative methods for mounting the replaceable tread construction 140 to the resilient wheel 130 will be apparent to those having ordinary skill in the art, and are comprehended by the present invention. Furthermore, the replaceable tread construction 140 may be formed in segments, each of the segments being bolted to a respective portion of the resilient wheel 130 to form a completed tread therearound.

It will be appreciated by those having ordinary skill in the art that the composite wheel/tread 150 of FIG. 8 represents an improvement over the prior art solid pneumatic-shaped tires. Because a large percentage of the tire is permanently incorporated into the wheel 130, and because a system is provided for removing and replacing the tread layer 140, the cost of using the wheel 150 over a period of time is substantially less than the cost of using the prior art tire designs. This is because it is only necessary to purchase and replace the tread layer of the tire 150 when it has been worn beyond its useful life, whereas it was necessary to replace the tread layer, base layer, and resilient rubber layer (if applicable) with the prior art tire whenever the tread layer was worn out. It will therefore be appreciated by those having ordinary skill in the art that the wheel 150 represents an improvement over the prior art designs.

Figure 9:
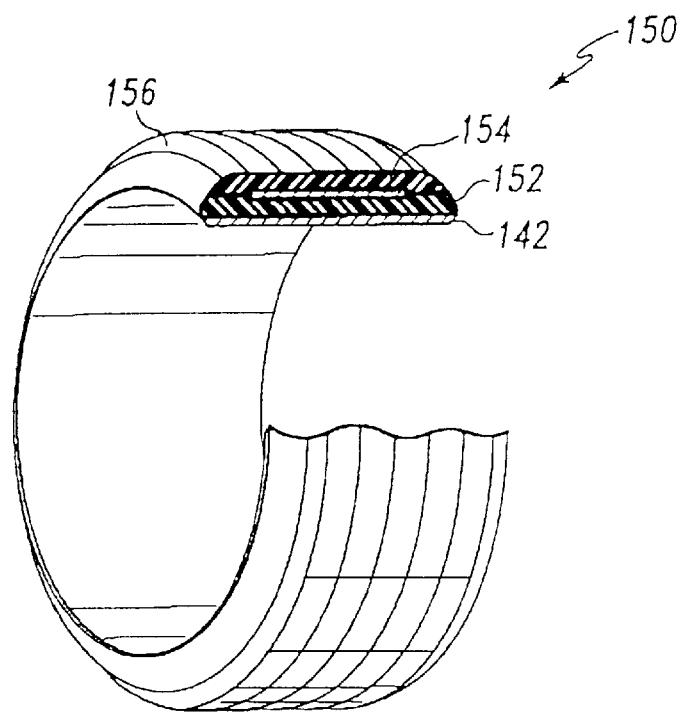
FIG. 9 is a partial cross-sectional perspective view of a preferred embodiment replaceable tread construction of the present invention.

Referring now to FIG. 9, there is illustrated an alternative, preferred embodiment, of a replaceable tread construction of the present invention which may be used with the resilient wheel 130, the preferred embodiment replaceable tread construction being indicated generally at 150. Like the first embodiment replaceable tread construction 140, the preferred embodiment replaceable tread construction 150 includes a second 360° rigid band 142, such as a steel band. A layer of cushion rubber 152 is formed on the exterior surface of the steel band 142, and a third 360° steel band 154 is formed on the cushion rubber 152. A tread rubber layer 156, such as the black compound disclosed hereinabove, is then formed on the outer surface of the third steel band 154. Preferably, the outer edges of the steel band 154 are enclosed by the cushion rubber layer 152 and the tread rubber layer 156. Thus constructed, the replaceable tread construction 150 may be fitted to the resilient wheel 130 as described hereinabove.

It is believed that the preferred embodiment replaceable tread construction 150 provides an advantage over the first embodiment replaceable tread construction 140, in that the steel band 154 provides a 360° reinforced platform for the tread compound 156, which serves to distribute the load forces from the vehicle throughout the tire 130/150. With the inclusion of the steel band 154, the majority of the load forces are no longer concentrated in the portion of the replaceable tread construction lying directly below the wheel 130. Instead, the 360° steel band 154 causes a distribution of the load forces throughout the tire 130/150, such that the load not only rests upon the lower portion of the tread construction 150, but also "hangs" from the upper portions of the tread construction 150. By distributing the load in this manner, the effective load weight on any given portion of the replaceable tread compound 150 located below the resilient wheel 130 is considerably less than would be the case if the steel band 154 were not present (such as with the first embodiment replaceable tread construction 140 of FIG. 7). Thus, the replaceable tread construction 150 of FIG. 9 provides greater load capacity and a more effective tire system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A resilient wheel having a press-on solid pneumatic tire, comprising:

a wheel hub having an outer hub surface;

a first resilient layer having a first outer resilient surface and a first inner resilient surface in contact with the outer hub surface;

a first 360 degree rigid band having a first inner band surface facing the outer resilient surface and a first outer band surface;

a second 360 degree rigid band having a second inner band surface in contact with the first outer band surface and a second outer band surface;

a second resilient layer having a second outer resilient surface and a second inner resilient surface facing the second outer band surface;

a third 360 degree rigid band having a third inner band surface facing the second outer resilient surface and a third outer band surface; and a tread layer having an inner surface facing the third outer band surface.

2. The resilient wheel of claim 1, wherein the first inner resilient surface is bonded to the outer hub surface.

3. The resilient wheel of claim 1, wherein the first inner band surface is bonded to the first outer resilient surface.

4. The resilient wheel of claim 1, wherein the first rigid band comprises a first band of steel.

5. The resilient wheel of claim 4, wherein the first rigid band comprises C1015 steel.

6. The resilient wheel of claim 1, wherein the first and second resilient layers comprise natural rubber.

7. The resilient wheel of claim 1, wherein the second rigid band is coupled to the first rigid band by a friction fit.

8. The resilient wheel of claim 1, wherein the second rigid band is bolted to the first rigid band.

9. The resilient wheel of claim 1, wherein the second rigid band comprises a second band of steel.

10. The resilient wheel of claim 9, wherein the second rigid band comprises C1015 steel.

11. The resilient wheel of claim 1, wherein the second inner resilient surface is bonded to the second outer band surface.

12. The resilient wheel of claim 1, wherein the third inner band surface is bonded to the second outer resilient surface.

13. The resilient wheel of claim 1, wherein the third rigid band comprises a third band of steel.

14. The resilient wheel of claim 13, wherein the third rigid band comprises C1015 steel.

15. The resilient wheel of claim 1, wherein the tread layer is bonded to the third outer band surface.

16. The resilient wheel of claim 1, wherein the tread layer comprises:

natural rubber;

synthetic rubber;

carbon black;

a cure system;

an aging system; and a plasticity system.

* * * * *

UNITED STATES PATENT AND TRADEMARK OFFICE
CERTIFICATE OF CORRECTION

PATENT NO.    : 6,142,203  
DATED         : November 7, 2000  
INVENTOR(S)   : Calvin F. Bickford Page 1 of 1

It is certified that error appears in the above-identified patent and that said Letters Patent is hereby corrected as shown below:

Column 4,  
Line 48, please change "rein-forced" to -- reinforced --.

Signed and Sealed this

Fifth Day of February, 2002

*Attest:*

JAMES E. ROGAN  
*Director of the United States Patent and Trademark Office*

*Attesting Officer*